UNITED STATES PATENT OFFICE 2,574,444

SUBSTITUTED ARYL 6-TETRAHYDRO-PYRANYL ETHERS

Richard R. Whetstone, Albany, Calif., assignor to Shell Development Company, San Francisco, Calif., a corporation of Delaware No Drawing. Application December 27, 1948, Serial No. 67,573

12 Claims. (Cl. 260—333)

This invention relates to new heterocyclic organic chemical compounds and to a process for their preparation, and the invention relates more particularly to new and useful derivatives of tetrahydropyran.

The novel compounds to which the invention relates are aryl ethers of carbonyl-substituted tetrahydropyranols, having structures described by the general formula

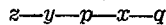

in which:

$z$ represents an aryl radical,
$y$ represents a divalent atom of an element of group VI having an atomic weight below 40,
$p$ represents a 2,6-tetrahydropyranylene radical,
$x$ represents a carbonyl group, and
$q$ represents a member of the class consisting of hydrogen and hydrocarbyloxy.

It has been discovered that the compounds described by the above formula have desirable and distinctive characteristics which could not have been foreseen and which render the novel products of improved value in various applications. Unexpectedly, it has been discovered that compounds which are described by the above formula when the monovalent radical represented by $q$ is a hydrocarbonyloxy group, preferably an alkoxy group, have the desirable characteristic of being highly toxic to animal life, particularly to invertebrates, while at the same time having no or only low toxicity toward higher animal life and towards many species of plants in the concentrations and amounts toxic to the lower animal life. As a result of these characteristics, such compounds may be employed advantageously for combatting, by killing, undesired lower animal life, such as insects and the like, in the presence of higher animal life and/or plants with minimum danger to either of the latter.

As a further example of the improved utility obtained in the compounds of the invention, the aryl ethers of carbonyl-substituted tetrahydropyranols described by the above generic formula when the monovalent radical represented by $q$ is a hydrogen atom, have a unique and desirable action in rendering normally water-soluble proteins insoluble in water and in increasing the resistance to water of water-insolubilized protein substances. They may be employed with advantage as hardeners or insolubilizers for proteins and proteinaceous substances. For example, small amounts of such compounds may be incorporated in paints and like compositions containing protein substances, e. g., casein, soy bean protein, albumin, etc., as the only or as one of the principal film-forming ingredients. Improved durability, wash-resistance, and water-resistance will be imparted to the hardened or dried film by the action of the present novel compounds contained therein. Within the latter subgroup of compounds, those that are described by the foregoing formula when the atom represented by $x$ is an oxygen atom, are of added interest as hardening agents for photographic gelatin, as photographic film, and they may be employed for such purposes before or after development of the latent image.

The aryl ethers of carbonyl-substituted tetrahydropyranols in which the monovalent radical, $q$, is a long-chain alkoxy group, such as the alkoxy group of an aliphatic alcohol containing from 10 to 18 carbon atoms, also are of especial interest. Their physical characteristics of volatility, melting point and compatability with a wide variety of materials, including natural and synthetic resins and cellulose derivatives, are such that they are of potential value as improved softening agents, plasticizers, and the like.

The novel compounds may be prepared in accordance with the invention by condensing under controlled substantially anhydrous conditions, in the presence of an acidic condensation catalyst, phenols and thiophenols with Δ⁵-dihydropyrans substituted in position No. 2 of the dihydropyran ring by a monovalent carbonylic group represented by —$x$—$q$, in which $x$ and $q$ have their previously explained significance. The condensation may be effected with excellent yields of the desired products by mixing in liquid phase the phenol or thiophenol and the substituted Δ⁵-dihydropyran, and maintaining the mixture at a suitable temperature under substantially anhydrous conditions in the presence of the condensation catalyst until the reaction is partially or substantially completed. Although any of the known acidic condensation catalysts which does not in itself combine or react with the reactants may be used, it is preferred to employ a strong acid, preferably a strong mineral acid, as the condensation catalyst. Suitable strong acids include, among others, hydrochloric acid, sulfuric acid, phosphoric acid, hydrobromic acid, selenic acid, sulfurous acid, nitric acid, and even strong organic acids, such as aromatic sulfonic acids, trichloroacetic acid, oxalic acid, and the like. Even acidic salts may be used, including aluminum sulfate, zinc chloride, sodium acid phosphate, sodium bisulfate, and the like. The strong mineral acids are the preferred condensation catalysts. Only a trace of the condensation catalyst ordinarily is required in the reaction mixture. When the condensation catalyst is a strong acid, amounts as little as about 0.001% based on the weight of the reactants may be employed. As much as 5% of a strong mineral acid may be used, amounts from about 0.05% to about 2% by weight of the reactants being preferred. Weakly acidic catalysts may be employed in somewhat greater amounts, depending upon their strength as acids.

It is essential for the preparation of the desired products to employ substantially anhydrous conditions. Operation under substantially anhydrous conditions would not preclude use of technical grades of the reactants, even though they might contain detectable traces of moisture, and it even permits addition of concentrated aqueous solutions of the acidic condensation catalyst, for example, a strong mineral acid normally obtainable in the form of such a concentrated aqueous solution. The small amounts of water thus encountered do not do significant harm. Substantially greater amounts of water, in the presence of the acidic substances employed as condensation catalysts, favor the formation of undesired resinous products and other products of side reaction substantially proportionate to the amount of water present. The moisture content of the reaction mixture, therefore, desirably is maintained at a minimal level.

Depending upon the reactants employed as well as upon the temperature, the amount of the acidic catalyst, and other reaction conditions, reaction times of from about ½ hour to several days or more may be employed. However, if the dihydropyran reactant contains a substituent group which in itself is reactive with phenols, e. g., the formyl group as in the 2-formyl-$\Delta^5$-dihydropyrans, reaction times not over about 24 hours preferably are employed since otherwise there is liable to occur excessive polymerization or other undesired side reactions with resultant reduced yield of the products desired in accordance with the present invention. When reaction times greatly in excess of 24 hours are employed, such reactants may be completely converted to polymeric or resinous products, and no detectable amounts of the presently desired products obtained.

The phenol or thiophenol and the $\Delta^5$-dihydropyran substituted in position No. 2 generally are employed in substantially equimolar amounts. A suitable more general range comprises mole ratios between the reactants of from about 1/5 to about 5/1. Reaction temperatures of from about 0° C. to 100° C., more or less, may be employed, a preferred range, because of the maximal yields of the desired products obtained therein, being from about 20° C. to about 75° C. The condensation reaction may be effected in the absence of solvents, or an inert solvent, such as benzene, toluene, n-octane, chloroform, diisopropyl ether, dioxane, or other hydrocarbon, halogenated hydrocarbon, ether, or the like, may be included in the reaction mixture, if desired. The reactants and the catalyst and the solvent, if one is employed, may be mixed in any order. After the reaction has proceeded for a suitable time with warming of the reaction mixture, if desirable, the desired product may be recovered in any suitable manner, as by fractional distillation, by extraction with selective solvents, or by other applicable procedures. Any unreacted reactants remaining in the reaction mixture may be employed in the preparation of further quantities of the desired product.

The invention is generic to compounds having the structure represented by the formula

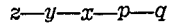

in which $z$, $y$, $p$, $x$ and $q$ signify the groups and atoms hereinbefore explained, which compounds may be prepared by condensing phenols and thiophenols represented by $z$—$y$—H, with $\Delta^5$-dihydropyrans substituted in position No. 2 by the group ——$x$—$q$. Suitable phenols and thiophenols include phenol itself, as well as thiophenol, $C_6H_5SH$, and also their various respective substitution products in which one or more of the hydrogen atoms of the aryl nucleus may have been replaced by substituent groups and/or atoms, and which substituents may in turn be substituted. Preferred phenols and thiophenols are those containing one —OH group and one —SH group, respectively. The substituted $\Delta^5$-dihydropyran which may be condensed with phenols and with thiophenols to produce the novel compounds of the invention are, as indicated previously, those which contain at position No. 2 of the dihydropyran ring an extranuclear carbonyl group which, in turn, is directly linked to a monovalent radical of the class consisting of hydrogen and hydrocarbyloxy. The dihydropyran ring may be substituted by one or more additional groups or atoms, or in accordance with a preferred embodiment of the invention, it may be otherwise unsubstituted.

A valuable subgroup of compounds which may be prepared according to the present invention is composed of the 6-aryloxy-2-carboxy tetrahydropyrans and monohydric alcohol esters of 6-aryloxy-2-carboxy tetrahydropyrans, obtainable by condensing according to the process of the invention phenols with $\Delta^5$-dihydropyran-2-carboxylic acids and with monohydric alcohol esters of $\Delta^5$-dihydropyran-2-carboxylic acids, respectively. The carboxyl group of the acid may be esterified by the radical of a monohydric alcohol containing from 1 to 20 carbon atoms. The alcohol radical may be derived from an open-chain saturated monohydric alcohol, an open-chain unsaturated monohydric alcohol, and even from closed-chain or cyclic alcohols, such as the cycloaliphatic monohydric alcohols, as well as alcohols substituted by one or more aryl groups. A more limited subgroup of compounds provided by the invention may be defined by the subgeneric formula

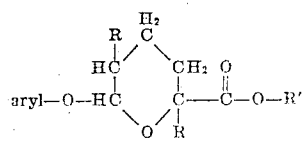

in which R represents the hydrogen atom or a lower alkyl group, and R' represents a monovalent hydrocarbon group, preferably one containing from 1 to 20 carbon atoms.

Illustrative compounds defined by the foregoing formulas include, among others, the following: 6 - phenoxy - 2 - carbethoxytetrahydropyran, 6 - phenoxy - 2 - carbopropoxytetrahydropyran, 6 - phenoxy - 2,5 - dimethyl - 2 - carbomethoxytetrahydropyran, 6-(3-methylphenoxy)-2-carbobutoxytetrahydropyran, 6-(2,4-dimethylphenoxy) - 2,5 - diisopropyl - 2 - carbaryloxytetrahydropyran, 6 - (4 - methoxyphenoxy) - 2 - carbethoxytetrahydropyran, 6 - (2,4 - dinitrophenoxy) - 2,5 - diethyl - 2 - carbobutoxytetrahydropyran, 6 - phenoxy - 2 - methyl - 2 - carbisopropenyloxytetrahydropyran, 6-(2,6 - diethylphenoxy) - 2 - carbethoxytetrahydropyran, 6-phenoxy - 2,5 - dimethyl - 2-carbohexyloxytetrahydropyran, 6 - phenoxy - 2,5 - dimethyl - 2-carboctyloxytetrahydropyran, 6 - biphenyloxy-2-carbodecyloxy-tetrahydropyran, 6-naphthoxy-2 - carbethoxytetrahydropyran, 6 - phenoxy - 2,5 - diethyl - 2 - carballyloxytetrahydropyran, 6 - (4 - methylphenoxy) - 2 - carbotetradecyloxytetrahydropyran, 6 - phenoxy - 2,5 - dimethyl - 2 - carboctyloxytetrahydropyran, 6 - (4 - t - butylphenoxy) - 2 - carbeicosyloxytetrahydropyran, 6 - phenoxy - 2 - carbomethallyloxytetrahydropyran.

A further valuable subgroup of compounds provided by the invention is obtained by condensing phenols having at least one of the aryl hydrogen atoms replaced by a halogen atom, preferably a chlorine or a bromine atom, with lower alkyl esters of Δ⁵-dihydropyran-2-carboxylic acids, preferably the esters wherein the alkyl group contains from 1 to 8 carbon atoms. Compounds defined by this subgroup wherein there is an atom of halogen in at least one of the No. 2 and the No. 4 positions of the aryl nucleus, are of interest as biologically active compounds which may be employed as direct toxicants and also for the preparation of biologically active compounds. For example, 6 - (2,4 - dichlorophenoxy) - 2 - carbethoxytetrahydropyran has been found to be highly toxic to the two-spotted mite, Tetranychus bimaculatus, and also may be employed to combat the Pacific mite which infests and attacks citrus groves and other agriculturally important crops. Other compounds of this important subgroup which may be prepared according to the invention include, without being limited to, the following: 6-(2-bromo-4 - chlorophenoxy) - 2 - carbethoxytetrahydropyran, 6 - (2,4 - dibromophenoxy) - 2 - carbisopropoxytetrahydropyran, 6 - (2,4 - dichloro - 3 - methoxyphenoxy) - 2,5-dimethyl - 2 - carbethoxytetrahydropyran, 6 - (2,4,6 - trichlorophenoxy) - 2 - carbopropoxytetrahydropyran, 6- [4 - (2,4 - dichlorophenoxy) - 3,5 - dichlorophenoxy] - 2 - carbethoxytetrahydropyran, and 6 - (2,4,6 - trichlorophenoxy) - 2,5 - dichloromethyl - 2 - carbethoxytetrahydropyran.

A further subgroup of compounds provided by the invention is composed of those products obtainable by condensing according to the process of the invention thiophenols, which may be substituted in the aryl nucleus, with Δ⁵-dihydropyran - 2 - carboxylic acids and with esters, particularly monohydric alcohol esters, of Δ⁵-dihydropyran - 2 - carboxylic acids. Compounds within this subgroup include, among others, the following: 6-phenylmercapto-2-carbethoxytetrahydropyran, 6 - phenylmercapto - 2,5 - dimethyl-2 - carbethoxytetrahydropyran, 6 - (3,5 - dimethylphenylmercapto) - 2 - carbobutoxytetrahydropyran, 6 - (4 - methylmercaptophenylmercapto) - 2 - carboheptyloxytetrahydropyran, 6 - phenylmercapto - 2,5 - diethyl - 2 - carbisobutoxytetrahydropyran, and 6 - (2,4 - dichlorophenylmercapto) - 2 - carbomethoxytetrahydropyran.

A further subgroup of compounds of the invention having distinctive and desirable properties may be prepared by condensing phenols and thiophenols in the presence of an acidic condensation catalyst and under substantially anhydrous conditions with dihydropyran aldehydes unsaturated in the 5,6-position of the dihydropyran nucleus and having the formyl group directly attached to position No. 2 of the dihydropyran nucleus. The products are in general high-boiling liquids to soft solids which, as hereinbefore indicated, may be employed for the precipitation and/or hardening of protein substances, and which also are of value as chemical intermediates for the preparation of derived organic compounds. A preferred subgroup of compounds may be described in a more specific embodiment by the formula:

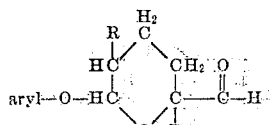

in which R represents the hydrogen atom or a hydrocarbon group, such as a lower alkyl group. Illustrative compounds represented by the above formula include, among others, the following:

6-phenoxy-2-formyltetrahydropyran,
6 - phenoxy - 2,5 - dimethyl - 2 - formyltetrahydropyran,
6 - (4 - methoxyphenoxy) - 2 - formyltetrahydropyran,
6 - (4,5,6 - trimethylphenoxy) - 2 - methyl - 2 - formyltetrahydropyran,
6 - (4 - sulfophenoxy) - 2 - formyltetrahydropyran,
6 - (4 - t - butylphenoxy) - 2,5 - diisopropyl - 2 - formyltetrahydropyran,
6 - (4 - nitrophenoxy) - 2 - formyltetrahydropyran,
6 - naphthoxy - 2 - formyltetrahydropyran,
6 - (4 - neopentylphenoxy) - 2 - formyltetrahydropyran,
6 - (2,4,6 - trichlorophenoxy) - 2 - formyltetrahydropyran,
6 - (2,6 - dimethyl - 4 - t - butylphenoxy) - 2,5 - diethyl-2-formyltetrahydropyran.

The following examples present illustrative specific compounds representative of the more generic classes of compounds which may be prepared according to the invention and illustrate the method whereby these and hereinbefore enumerated products may be prepared by reacting phenols and thiophenols with Δ⁵-dihydropyrans substituted by a carbonyl group in position No. 2 of the dihydropyran ring. It will be understood that the examples are intended to be illustrative and that they are not intended to be construed as limiting the scope of the invention defined in the hereto appended claims. In the examples, the parts are by weight unless otherwise specified.

*Example I*

To a solution of 35.7 parts of phenol dissolved in 44 parts of benzene, there were added 51.5 parts of 2-carbethoxy-Δ⁵-dihydropyran. To the resulting solution there were added 2 parts of a solution of hydrogen chloride in benzene containing 0.28 mol of hydrogen chloride per liter of solution. The resulting mixture was heated and maintained within the temperature range of 50° C. to 75° C. for one hour and then allowed to cool to room temperature and to stand at room temperature for 5 days. The mixture then was washed with several portions of water in order to remove the hydrogen chloride and the washed solution was fractionally distilled under reduced pressure. After removal of the benzene and lower boiling forerun, a fraction amounting to 74 grams was collected at distillation temperature of 129.6° C. to 132° C. under a pressure of 1–2 millimeters of mercury. The product thus collected in a yield of 89% of theory was identified as 6-phenoxy-2-carbethoxy tetrahydropyran having the structure described by the formula

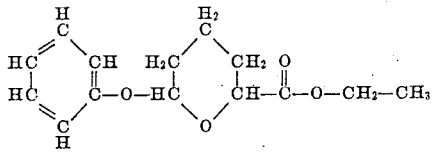

The product was found to have a refractive index ($n_D^{20}$) of 1.5103. A sample of the product was analyzed for carbon and hydrogen and was found to contain 67.21% carbon and 7.27% hydrogen compared to values calculated for the formula $C_{14}H_{18}O_4$ of 67.91% carbon and 7.25% hydrogen. The ester value of the product was found to be .407 equivalents per 100 grams compared to a theoretical value of .399 equivalents per 100 grams. The product was a clear colorless mobile liquid having a pleasant odor and having volatility characteristics indicating usefulness as a high-boiling solvent.

*Example II*

In 90 parts of benzene there were dissolved 94 parts of phenol and 140 parts of 2,5-dimethyl-2-formyl-$\Delta^5$-dihydropyran, and to the solution there were added 10 parts of a solution of hydrogen chloride in benzene containing 0.17 mol of hydrogen chloride per liter. Following the addition of the hydrogen chloride solution the reaction mixture warmed spontaneously to about 40° C. After the initial reaction had subsided the mixture was allowed to stand at room temperature overnight. It then was treated with an anion exchange resin to remove the hydrogen chloride and the treated solution was fractionally distilled through a fractionating column under reduced pressure. The fraction distilling between 111.6° C. and 123° C. under pressure of 1–2 millimeters of mercury, amounting to 63 parts, was collected and redistilled under a pressure of 2 millimeters of mercury. The redistilled fraction distilling between 116.2° C. and 126° C. was collected and identified as the substituted tetrahydropyran aldehyde 2,5-dimethyl-6-phenoxy-2-formyltetrahydropyran having the structure represented by the formula

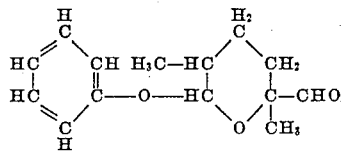

The product was analyzed and found to contain 71.67% carbon and 7.76% hydrogen compared to values of 71.76% carbon and 7.74% hydrogen calculated for the formula $C_{14}H_{18}O_3$. The refractive index ($n_D^{20}$) of the product was found to be 1.5158.

*Example III*

To a mixture of 47 grams of phenol and 56 grams of 2-formyl-$\Delta^5$-dihydropyran there was added one part of a solution of hydrogen chloride in methanol containing one mol of hydrogen chloride per liter of solution. The mixture was warmed to 50° C. and held approximately at this temperature for ½ hour. It then was allowed to cool to room temperature and was allowed to stand at room temperature for an additional 18 hours. The resulting syrupy liquid was diluted with 25 parts of benzene, the diluted solution was treated with an anion exchange resin to remove the hydrogen chloride and the treated solution was fractionally distilled under reduced pressure through a short fractionating column. Seventeen parts of the original reactants were recovered as forerun following the distillation of the benzene. Fifty-five grams of product, corresponding to a conversion of reactants to product of 53%, then were collected at a distillation temperature of 130° C. to 135° C. under a pressure of 5 millimeters mercury. The product was found to have a refractive index ($n_D^{20}$) of 1.5250. It was identified as the substituted tetrahydropyran aldehyde 6-phenoxy-2-formyltetrahydropyran having the structure represented by the formula

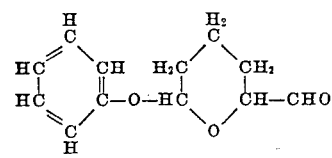

The product was analyzed and found to contain 69.61% carbon and 6.88% hydrogen compared to values of 69.89% carbon and 6.85% hydrogen calculated from the formula $C_{12}H_{14}O_3$. The products prepared in this and the immediately preceding examples are useful as chemical intermediates and they also may be employed as biologically active compounds or as intermediates for the preparation thereof.

*Example IV*

To a solution of 123 parts of 2-formyl-$\Delta^5$-dihydropyran and 102 parts of phenol in 175 parts of benzene there was added $\frac{1}{10}$ part of sulfuric acid. The resulting mixture was warmed to 50° C. for a period of one hour and then allowed to stand for 18 hours at room temperature. The mixture was treated with an anion exchange resin to remove the sulfuric acid and then fractionally distilled under reduced pressure. The product, 6-phenoxy-2-formyltetrahydropyran was recovered in a conversion of reactants to products of 43% and in a yield of 60.5% based upon the reactants consumed.

*Example V*

Fifty-one parts of 2,4-dichlorophenol and 45 parts of 2-carbethoxy-$\Delta^5$-dihydropyran were dissolved in 37 parts of benzene and to the solution was added $\frac{1}{10}$ part of sulfuric acid. The solution was heated at 50° C. for ½ hour, the sulfuric acid then was neutralized by addition of a slight excess of barium carbonate and the filtered solution was fractionally distilled. The product distilled at a temperature of 160° C. to 170° C. under a pressure of 1 to 2 millimeters of mercury. The product, recovered in a 74% conversion of reactants to product, was identified as 6-(2,4-dichlorophenoxy)-2-carbethoxytetrahydropyran having the structure represented by the formula

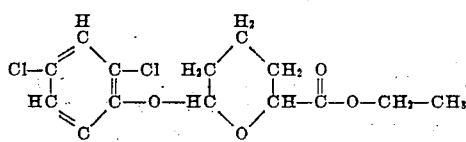

A 5% by weight solution of the 6-(2,4-dichlorophenoxy)-2-carbethoxytetrahydropyran in a low-boiling odorless petroleum distillate was tested for its toxicity against the two-spotted mite, *Tetranychus bimaculatus*, by exposing a group of the mites to the atomized solution. The solution was found to be highly toxic to the mites, 86% mortality being found 24 hours after the application. A second group of the mites treated under identical conditions with the solvent alone showed only 3% mortality after 24 hours following the application.

Δ⁵-dihydropyrans substituted in position No. 2 of the dihydropyran ring by a monovalent carbonylic substituent group represented by —x—q suitable for use in the process of the present invention may be prepared as described in applications Serial No. 706,102, filed October 28, 1946, now U. S. Patent No. 2,514,172, and Serial No. 713,455, filed December 2, 1946, now U. S. Patent No. 2,479,283.

I claim as my invention:

1. A chemical compound having a structure defined by the formula

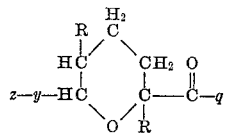

in which $z$ represents a radical of the class consisting of unsubstituted aromatic hydrocarbon and halogen-substituted aromatic hydrocarbon, $y$ represents a divalent atom of an element of group VI having an atomic weight below 40, R represents a member of the class consisting of hydrogen and hydrocarbon, and $q$ represents a member of the class consisting of hydrogen and hydrocarbyloxy.

2. 6 - phenoxy-2-carbohydrocarbyloxytetrahydropyran.

3. 6-(2,4 - dichlorophenoxy) - 2 - carbethoxytetrahydropyran.

4. 6-phenoxy-2-formyltetrahydropyran.

5. 6-phenoxy-2-carboalkoxytetrahydropyran.

6. 2,5 - dimethyl-6-phenoxy-2-formyltetrahydropyran.

7. 6-halophenoxy - 2 - carboalkoxytetrahydropyran.

8. A process which comprises condensing a monohydric phenol containing the phenolic hydroxyl group as the sole functional group and a Δ⁵-dihydropyran compound substituted in position No. 2 of the dihydropyran ring by the carbonyl group having the fourth valency of the carbon atom satisfied by union with a monovalent radical of the class consisting of hydrogen and hydrocarbyloxy, under substantially anhydrous conditions in the presence of an acidic condensation catalyst to produce a tetrahydropyran substituted in position No. 6 of the tetrahydropyran ring by the aryloxy group of said phenol and in position No. 2 of the tetrahydropyran ring by the carbonyl group having the fourth valency of the carbon atom satisfied by union with said monovalent radical.

9. A process which comprises condensing a monohydric thiophenol containing the phenolic mercapto group as the sole functional group with a Δ⁵-dihydropyran compound substituted in position No. 2 of the dihydropyran ring by the carbonyl group having the fourth valency of the carbon atom satisfied by union with a monovalent radical of the class consisting of hydrogen and hydrocarbyloxy, under substantially anhydrous conditions in the presence of an acidic condensation catalyst to produce a tetrahydropyran substituted in position No. 6 of the tetrahydropyran ring by the arylthio group of said thiophenol and in position No. 2 of the tetrahydropyran ring by the carbonyl group having the fourth valency of the carbon atom satisfied by union with said monovalent radical.

10. A process which comprises condensing 2-formyl-Δ⁵-dihydropyran and phenol in the presence of hydrogen chloride under substantially anhydrous conditions at a temperature of from about 20° C. to about 75° C. to produce 6-phenoxy-2-formyl-tetrahydropyran.

11. A process which comprises condensing 2-carbethoxy-Δ⁵-dihydropyran and 2,4-dichlorophenol in the presence of sulfuric acid under substantially anhydrous conditions at a temperature of from about 20° C. to about 75° C. to produce 6-(2,4 - dichlorophenoxy)-2-carbethoxytetrahydropyran.

12. 6 - dihalophenoxy-2-carbohydrocarbyloxytetrahydropyran.

RICHARD R. WHETSTONE.

REFERENCES CITED

The following references are of record in the file of this patent:

UNITED STATES PATENTS

| Number | Name | Date |
|---|---|---|
| 2,455,776 | Jones et al. | Dec. 7, 1948 |
| 2,489,729 | Smith | Nov. 29, 1949 |

OTHER REFERENCES

Woods and Kramer, J. Am. Chem. Soc., 69., 2122 (1947).